March 26, 1929.                H. P. CHANDLER                1,706,652
                               CURRENT COLLECTOR
                           Original Filed Oct. 9, 1926

Witness:
H. J. Stromberger

Inventor
HOMER P. CHANDLER

By
Attorney

Patented Mar. 26, 1929.

1,706,652

UNITED STATES PATENT OFFICE.

HOMER P. CHANDLER, OF MANSFIELD, OHIO, ASSIGNOR TO THE OHIO BRASS COMPANY, OF MANSFIELD, OHIO, A CORPORATION OF NEW JERSEY.

CURRENT COLLECTOR.

Application filed October 9, 1926, Serial No. 140,630. Renewed February 11, 1929.

My invention relates to current collectors in which a sliding shoe is employed.

One of the objects of my invention is to provide a collector of the character set forth in which the axis of the bearing or support between the shoe and the supporting member will coincide with the contact surface between the shoe and the trolley wire, or will coincide as closely as practical considering the fact that the contact surface is constantly changing with wear.

Another object of my invention is to pivotally hinge the shoe in its support and to provide means for maintaining the contact surface in a substantially horizontal position.

Another object of my invention is to provide a sliding contact mounted in a support and having means which will prevent the destructive engagement of the device with the overhead trolley construction should the shoe leave the trolley wire.

Another object of my invention is to provide a shoe to have a uniform pressure of contact throughout its contact path regardless of the speed or direction in which it is moving. This is quite important in cases where the shoe runs in both directions as when the vehicle to which it is attached is moved in a rearward direction.

Other objects will be apparent as I describe and set forth my invention hereinafter.

My invention resides in the new and novel combination and arrangement of the various parts hereinafter fully described and shown in the accompanying drawing.

Figure 1:
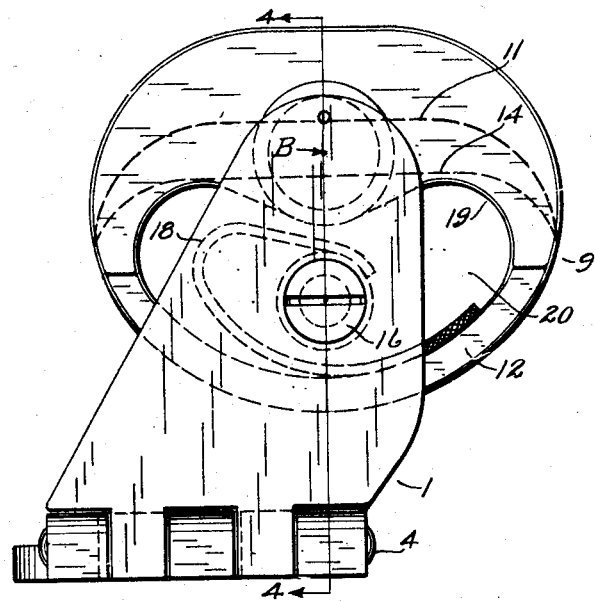
Fig. 1 is a side view in elevation of my invention.
Figure 2:
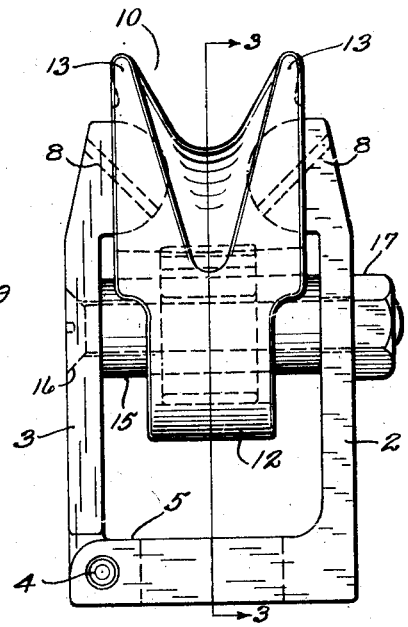
Fig. 2 is an end view of Fig. 1.
Figure 3:
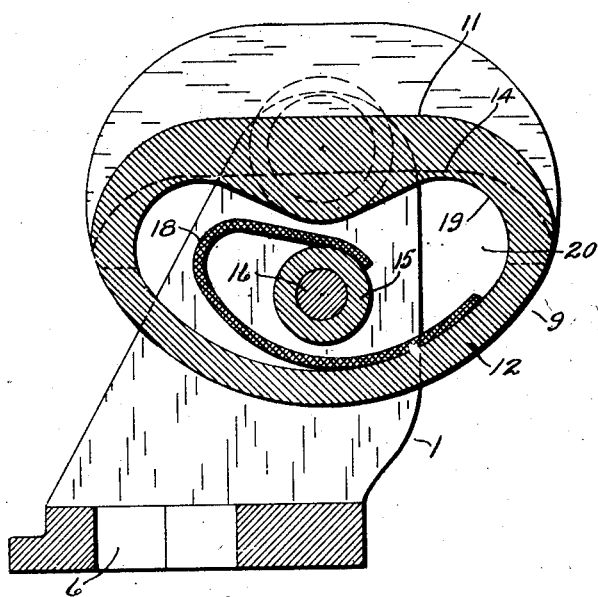
Fig. 3 is a section on the line 3—3 of Fig. 2.
Figure 4:
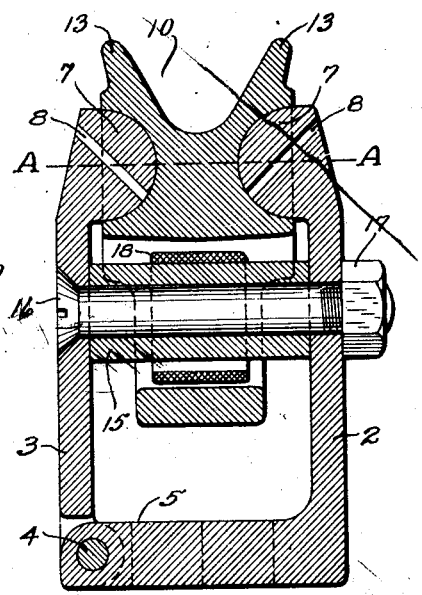
Fig. 4 is a section on the line 4—4 of Fig. 1.

In the preferred embodiment of my invention I employ a supporting harp 1 which is provided with the rigid arm 2 and the hinged arm 3. The arm 3 is held in hinged relation to the arm 2 by means of the pin 4 passing through the base member 5. The base member 5 is provided with a passage 6 by means of which the support may be secured to a trolley pole or other supporting structure.

The upper ends of the arms 2 and 3 are provided with inwardly projecting bosses 7 which act as bearings and are provided with hemispherical surfaces and having a common axis A—A. The surface of the bearings could be made conical if desired or have a flat face, but I find that by making the surface spherical the contact between the shoe and the bearings 7 has considerably higher efficiency and also a hemispherical surface has a universal joint relation to the shoe.

Positioned diagonally through the bearings 7 are oiling grooves 8.

Mounted upon the bearings 7 is the contact shoe 9 which is provided with an elongated groove 10 and the elongated contact surface 11 with the ends of the contact surface rounded or sloped downwardly to prevent shock when the shoe passes an overhead trolley wire support or other obstruction.

The side view appearance of the shoe is that of an ellipse although the shape, if desired, could be made round, but I prefer to avoid all corner notches, projections, etc., which will tend to catch upon the overhead trolley wire system and injure the same should the shoe leave the trolley wire while moving. This feature is helped out by the rim 12 which forms a complete continuation of the outer edge of the flanges 13 and thereby avoids the end of the shoe from catching and destroying the overhead construction as it would do if the member 12 was absent.

The member 12 also acts as a counter-balance to maintain the contact surface 11 in a horizontal position when the shoe is not in use thereby avoiding any necessity for turning means to bring the contact surface 11 into alinement with the trolley wire as is quite common with many shoes of the prior art.

As it is quite desirable to have as nearly as possible a constant working condition between the shoe and the trolley wire at all speeds and when either moving forward or back, I avoid, as far as possible, any tendency for a turning moment of the shoe about its pivotal axis due to friction between the shoe and the trolley wire when in operation, and I do this by having the axis A—A of the supporting bearings coincide as nearly as possible with the contact surface of the shoe. It will be apparent, however, that since there is wear to the surface of the shoe that the axis cannot be made to coincide with the contact surface at all times. It is possible, however, to have the axis midway between the original and final contact surface of the shoe, as for instance, if the contact surface 11 would wear down and form the contact surface 14, by the time the shoe was ready to scrap, then I would have the axis A—A pass through the point B which would be somewhat midway between the original and final bearing surface.

Of course, the axis A—A could be made to coincide with the contact surface 11 when new, or with the contact surface 14, but a better construction is to have it midway between these surfaces.

If I could maintain the axis A—A in line with the contact surface 11 at all times as it wore down there would be no turning moment about the axis A—A tending to rotate the shoe.

In order to adjust the pressure between the hemispherical bearing surfaces and permit the shoe to pivot I provide a spacing tube 15 which surrounds the through bolt 16. The length of the spacer 15 can be varied from time to time should the hemispherical bearing surfaces become worn, but I find that this is very seldom necessary as the wear to the bearing surfaces is very slight since there is very little movement of the parts, but which movement is more of a slight oscillating or pivotal movement about the axis A—A. By means of the nut 17 the arms are drawn tightly against the ends of the spacing member 15 and by making this spacing member preferably of a high current conducting material such as copper or bronze, and by connecting to it a flexible cable 18 of copper and which has its other end secured to the shoe, the current conducting capacity from the shoe to the support is materially increased.

The pivotal action of the shoe is limited either by the cable 18 or by the ends 19 of the slot 20 when it engages with the member 15.

I find that the cable 18 is not absolutely necessary as the bearings 7 will, as a rule, give ample contact surface with proper adjustment of the member 15, but the member 18 will increase the current carrying capacity from the shoe to the support if advisable.

It will also be evident that the members 7 may be positioned upon the faces of the shoe 9 and project therefrom into sockets in the ends of the arms 2 and 3 similar to those in the shoe. This construction amounts to merely a reversal of position of these parts.

There are modifications which will suggest themselves to those skilled in the art after having read my disclosure herein, therefore, I wish to be limited only by my claims.

I claim:

1. A current collector comprising a support, spaced arms on the support and one arm being hinged, oppositely disposed bearing members projecting inwardly from the arms and having hemispherical bearing surfaces, a sliding shoe mounted upon the bearings and having sockets cooperating therewith and provided with hemispherical bearing surfaces, a grooved contact surface on the shoe to engage a trolley wire and means to hold the arms in a predetermined relation to the shoe and permit oscillation of the shoe.

2. A current collector comprising a support, spaced arms on the support and one arm being hinged, oppositely disposed bearing members projecting inwardly from the arms and having bearing surfaces, a sliding shoe mounted upon the bearings and having sockets cooperating therewith and provided with bearing surfaces, a grooved contact surface on the shoe to engage a trolley wire and transversely disposed means to hold the arms in a predetermined relation to the shoe and permit oscillation of the shoe.

3. A current collector shoe having an elongated grooved contact surface, a circular rim consisting of a continuation of the ends of the shoe and bearing sockets in oppositely disposed faces of the shoe and having coinciding axes, the metal in the shoe being uniformly and symmetrically distributed longitudinally of the axis.

4. A current collector comprising a harp shaped support, a sliding shoe having an elongated contact surface to engage a trolley wire and bearings supporting the shoe on the harp, the transverse axis of the bearings coinciding with the contact surface of the shoe at a point midway the length of the contact surface and the amount of metal in the shoe being uniformly distributed relative to a transverse vertical plane in which the transverse axis rests.

5. A current collector comprising a harp shaped support, a sliding shoe having an elongated contact surface to engage a trolley wire, a circular rim consisting of a continuation of the ends of the shoe and means having hemispherical cooperating surfaces supporting the shoe on the harp, the transverse axis of the bearings coinciding with the contact surface of the shoe at a point midway the length of the contact surface.

6. A current collector comprising a support member having spaced arms and one of which is pivoted, a contact shoe having an elongated contact surface to engage a trolley wire, means supporting the shoe between the arms in pivotal relation thereto, the axis of the said means extending transversely through the shoe adjacent the contact surface, means to draw the arms toward each other and maintain them in a predetermined position relative to the shoe and flexible current conducting means secured to the shoe and to the said limiting means.

7. A contact shoe comprising a groove having an elongated contact surface subject to wear to engage a trolley wire, a circular rim consisting of a continuation of the ends of the shoe bearing sockets positioned in the opposite side faces of the shoe and having a common transverse axis piercing the shoe within the limits of wear of the contact surface.

8. An elliptically shaped contact shoe having a groove along one face provided with an elongated contact surface, a transverse slot below the groove and the walls forming the ends of the slot arranged to engage a stop and socket bearings having a common axis positioned between the slot and the contact surface and each bearing extending part way through the shoe.

9. A current collector comprising a shoe having an elongated grooved contact surface, a circular rim consisting of a continuation of the ends of the shoe and bearing sockets in oppositely disposed side faces of the shoe and having a common axis and the axis coinciding approximately with the contact surface of the shoe and a support for the shoe having hinged arms with projections thereon to enter the sockets to support the shoe.

10. A current collector comprising a shoe having an elongated grooved contact surface, a circular rim consisting of a continuation of the ends of the shoe and bearing sockets in oppositely disposed faces of the shoe and having coinciding axes and a support for the shoe having relatively movable arms with projections to enter the sockets to support the shoe.

In testimony whereof I affix my signature.

HOMER P. CHANDLER.